United States Patent [19]

Howard

[11] Patent Number: 4,486,136

[45] Date of Patent: Dec. 4, 1984

[54] DEVICE FOR DETERMINING WEIGHT OF OBJECTS BEING MOVED

[76] Inventor: Edwin L. Howard, 3040 Fox Trail, Fultondale, Ala. 35068

[21] Appl. No.: 417,844

[22] Filed: Sep. 14, 1982

[51] Int. Cl.$^3$ .............................................. G01G 7/00
[52] U.S. Cl. .................................. 414/21; 73/862.48; 177/211; 177/147; 294/86 R; 414/680; 414/731
[58] Field of Search .......................... 414/21, 731, 739; 294/86 R; 73/862.48; 177/211, 147

[56] References Cited

U.S. PATENT DOCUMENTS

| | | | |
|---|---|---|---|
| 2,851,171 | 9/1958 | Martin et al. | 177/147 X |
| 3,433,459 | 3/1969 | Logan | 294/86 R X |
| 3,695,467 | 10/1972 | Grundon | 414/739 X |
| 4,002,253 | 1/1977 | Ridler et al. | 414/739 X |

Primary Examiner—Robert J. Spar
Assistant Examiner—Donald W. Underwood
Attorney, Agent, or Firm—James J. Brown

[57] ABSTRACT

A device is described for determining the weight of objects being moved or loaded either individually or cumulatively. The device of the invention is particularly adapted for use with loaders such as the knuckle boom loader used for moving logs, poles and beams. An advantage of the invention is that it can be employed in conjunction with current models of loaders without requiring extensive modification of the loader device and can quickly and easily be removed when not needed. In one embodiment of the invention, heel means are provided for assisting in the moving and simultaneous weighing of large irregularly shaped objects such as logs and poles.

9 Claims, 4 Drawing Figures

DEVICE FOR DETERMINING WEIGHT OF OBJECTS BEING MOVED

The present invention is directed to a device for moving and loading various materials such as logs, poles, beams or other large objects; and is specifically directed to a loading device which permits determination of the weight of the object being moved or loaded simulatneously with the moving or loading operation. A particular embodiment of the present invention is the knuckle boom loader used for grasping and moving logs onto a truck or other vehicle.

BACKGROUND OF THE INVENTION

Various loading devices are known for grasping and moving large objects such as logs, poles and beams. One of the needs which frequently arises in such moving or loading operations is to be able to quickly and accurately determine the weight of the particular load of material being moved at one time and/or the cumulative weight of a plurality of such loads that are being placed on a particular vehicle. It is known to provide scales on a vehicle to which the load is being transferred so that the weight of the vehicle can be determined both before and after loading. Such scales are however costly and bothersome to use. It is also known to employ various weight measuring devices on the loading mechanism itself to permit measurement of the weight of the load during the loading operation, however such weighing mechanisms have required substantial modification of the loading device. Further, it is not always necessary or desirable to perform weighing operations during loading and in these instances devices of the prior art have proven difficult and time consuming to remove. Previous weighing devices which have been present on the loading mechanism have also not been readily adapted to differing requirements which are reflective of the size and shape of the load being moved and have not permitted easy modification or adaptability to such variations in the configuration of the load.

It is therefore an object of the present invention to provide a mechanism for quickly and easily determining the weight both cumulatively and individually of loads being transferred by a loading mechanism. It is a further object of the present invention to provide a mechanism for determining such weight that can readily be adapted to various configurations of loaders with little or no modification or expense and which can quickly be removed in instances where it is not needed.

These and other objectives are realized in accordance with the present invention as described herein.

BRIEF DESCRIPTION OF THE DRAWINGS

FIG. 3 is a detailed illustration of the load cell connecting mechanism and grapple.

The present invention will however be more fully appreciated by having reference to the following detailed description of the invention.

DETAILED DESCRIPTION OF THE INVENTION

Figure 1:
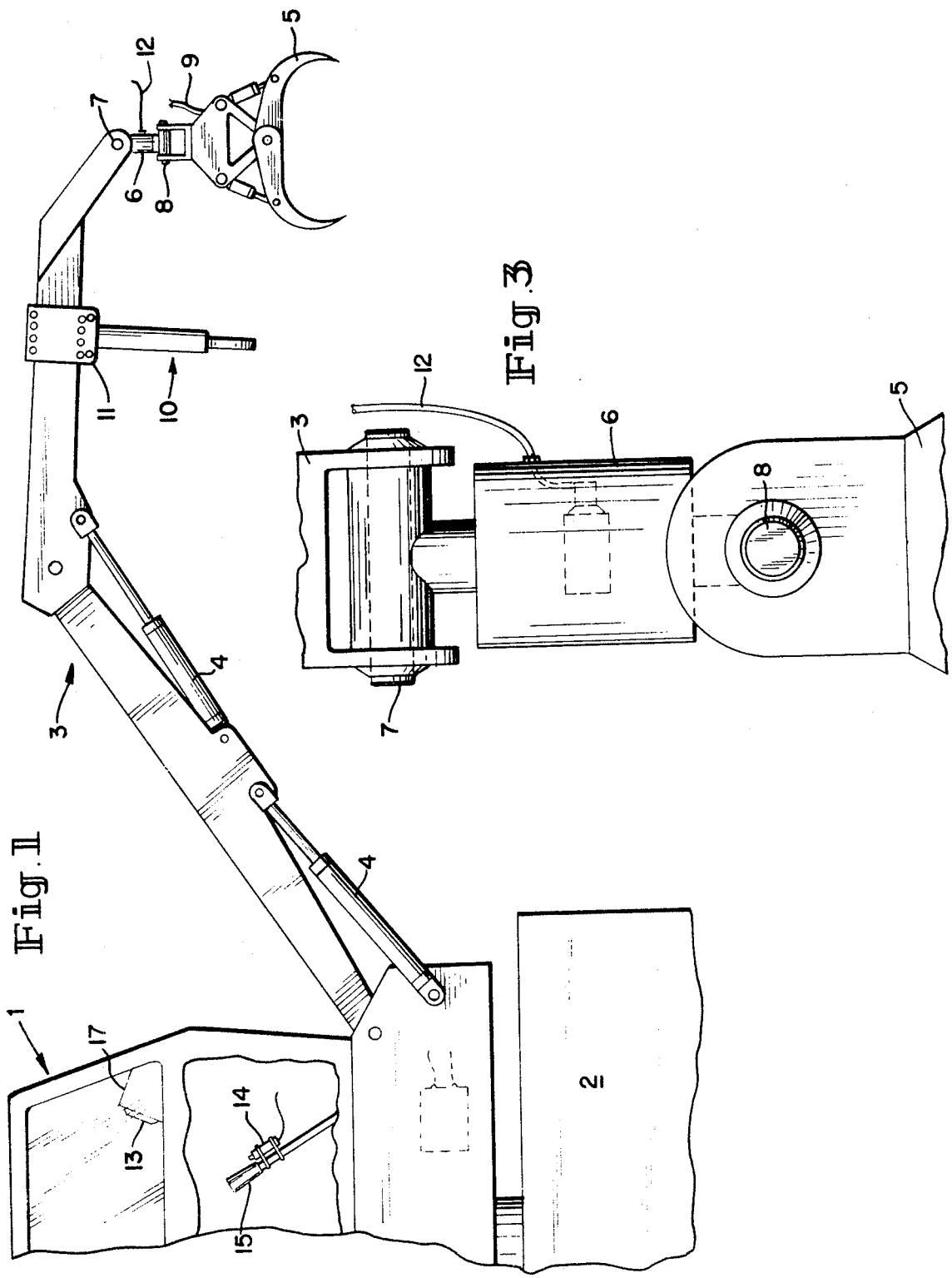
FIG. 1 is a partial cutaway view of a loader of the present invention including cab, vehicle body and object to be loaded.

FIG. 1 of the drawings illustrates the present invention in the one embodiment which is a hydraulically powered knuckle boom loader having a cab assembly 1 mounted on a vehicular supporting body 2 with pivotally mounted projecting boom 3 which can be moved in the vertical direction by means of hydraulic cylinders 4. A grapple 5 is provided at one end of the boom 3 and is hydraulically activated through line 9 to open and close around objects 16 which are to be picked up and moved. This grapple is capable of rotating in 180° to facilitate grasping and alignment.

Figure 2:
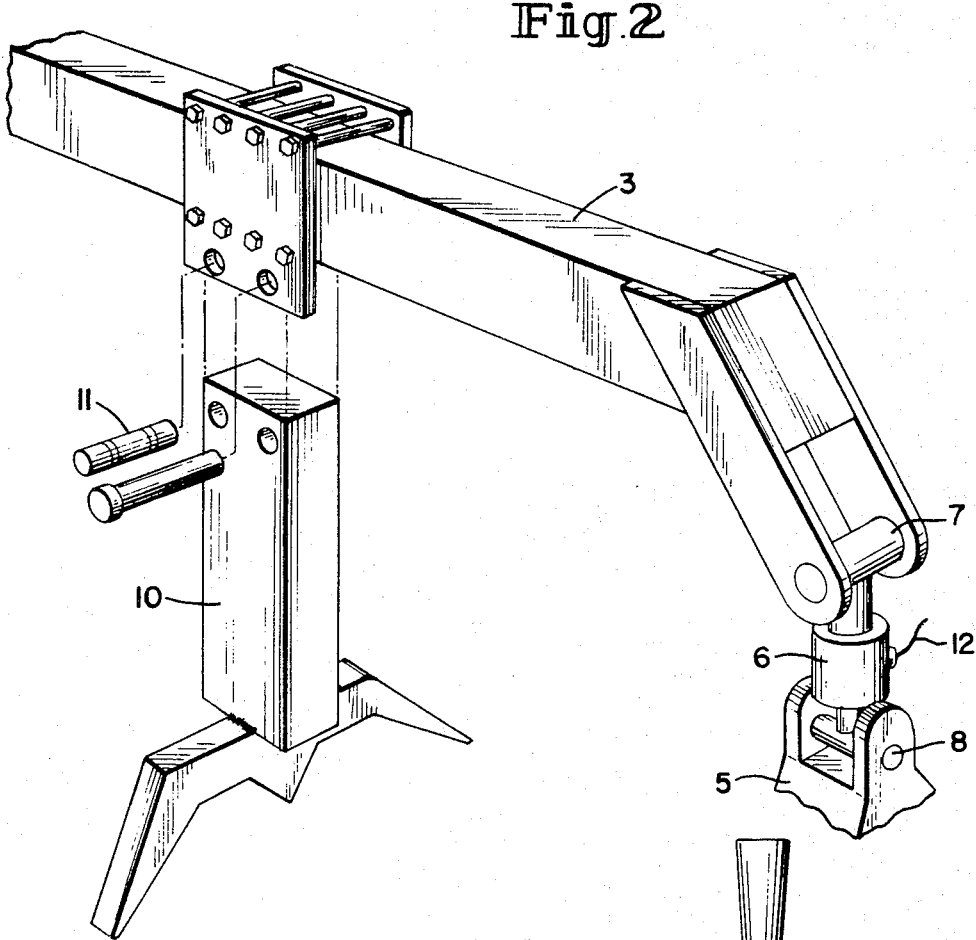
FIG. 2 is a view of the forward portion of the boom illustrating the heal and grapple assembly connection.

In order to determine the weight of objects being lifted by the loader, in accordance with the present invention, a load cell swivel 6 is pivotally mounted between the grapple 5 and the boom 3. The load cell itself is of conventional design and responds to downward force by producing an electric signal which is proportional to that force. The load cell swivel can be removed and replaced by simply removing two pins 7 and 8 that connected to the boom 3 and the grapple 5, respectively. In some operations, particularly where the objects being lifted are of fairly compact and uniform size, the grapple disposed at the end of the boom is alone sufficient for grasping and moving the object and weight of the object being moved can be determined directly from the load cell disposed between the grapple and the boom. In other operations such as where large and nonsymmetric objects such as logs, beams or poles are being lifted, it is often desirable to provide a heal assembly 10 mounted on the boom. This heal assembly is adapted to engage one end of the elongated object being moved while the grapple engages the object at about its mid-portion. As further shown in FIG. 1 of the drawings, the heal assembly 10 is advantageously attached to the boom by means of a pin or pins 11 which allow for measurement of the imbalanced object being raised. The pin which attaches the heal assembly to the boom in accordance with the present invention is a load pin for measuring the pressure exerted upward against the heal assembly and transmitting this information to the control unit in the cab 1. Thus, both the load pin 11 and the load cell swivel 6 transmit an electronic signal via connecting cable 12 to the indicator 13 mounted in cab 1 whereby the operator of the loading device is advised of the weight which is being picked up in each such moving operation. As illustrated in FIG. 2 of the drawings, where the boom assembly is not otherwise provided with means for attaching the heal assembly, adaptor plates can be provided on the boom to facilitate attachment of the heal assembly unit. Essentially the heal load pin or load pins replace standard heal pins which attach the heal assembly to the boom or boom attachment unit.

Figure 4:
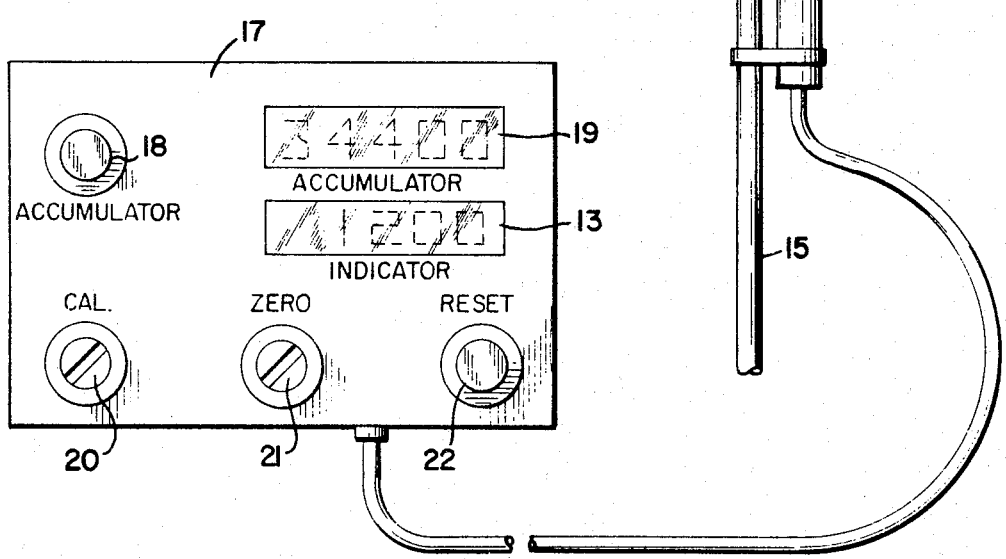
FIG. 4 is an illustration of the control module panel of the weight determining mechanism of the loader.

FIG. 4 illustrates the read-out panel of the control module mounted 17 in the cab of the loader of the present invention. As seen an accumulate button 18 is provided to permit summation in accumulator window 19 of the total amount of weight transported in a given operation. The indicator window 13 indicates the particular weight being lifted by the grapple at the end of the boom or where the heal assembly is being utilized, the sum of the weight registered by the load cell attached to the grapple and the force on the load pins attaching the heal assembly. Calibration 20 zero adjustment 21 and reset buttons 22 are also provided. An additional "add" or accumulator button 14 can also conveniently be provided on operating lever 15.

The load cell 6 typically employed in accordance with the present invention between the end of the boom 3 and the grapple is illustrated in FIG. 3 of the drawings. This load cell is of known construction and available commercially although adapted to be inserted by means of standard pins 7 & 8 between the grapple mechanism 5 and the end of the boom without requiring modification of the boom mechanism. In essence such load cells consist essentially of a plurality of strain gauges disposed within a housing in such a way that downward pressure on the mounted load cell causes slight deformation within the unit which registers on the strain gauges to produce an electric signal which is transmitted to the cab by cable 12 and which is proportional to the amount of downward force being exerted on the grapple. In use in accordance with the present invention, once the load cell is installed between the end of the boom and the grapple, it is first necessary to calibrate the unit to compensate for the weight of the grapple unit. Subsequent readings, which are transmitted to the cab, reflect the weight of the object being lifted.

The load pin or pins employed in accordance with the present invention to mount the heal assembly is similarly of a known design and is essentially a strain gauge of elongated configuration which responds to force exerted against the pin in a direction transverse to the longitudinal axis thereof to produce an electric signal proportional to the force. Such load pins are for example available from Toroid, Inc.

Although the present invention has been described particularly with reference to a knuckle boom loader of the type used for moving logs, poles and beams, it will be appreciated that the present invention is readily adapted for other lifting and moving operations in which it is desired to determine the weight both individually and cumulatively of the objects being moved. Thus, the grapple which is illustrated herein could be replaced by other means for grasping or holding various types and sizes of loads.

It will also be apparent for those of ordinary skill in the art that it is within the contemplation of the present invention to employ other boom mechanisms and that the system described herein could be readily employed with such systems.

I claim:

1. A loading device for engaging an object to be moved at two points on the object and determining its weight while lifting it comprising:

(a) a boom pivotally mounted on a base for horizontal and vertical movement;
   (b) means operatively connected to said boom to cause said vertical movement;
   (c) grapling means for grasping the load to be moved by said device at a point intermediate its ends;
   (d) load cell means responsive to the weight of the load lifted by said device pivotally interposed between and interconnected with said grapling means and one end of said boom for measuring the weight of said load when lifted vertically by said device;
   (e) means disposed on said boom intermediate of said grapling means and said base for engaging an end portion of said load engaged by said grapling means when said load is lifted; said engaging means being connected to said boom by load pin means for measuring the pressure exerted against said means during said lifting;
   (f) respective load indicator means remotely connected to said load cell means and said load pin means to register respectively the downward force on the load cell means and the upward force on said load pin means during lifting; and means for determining the weight of load being lifted from the combination of said registered downward and upward forces.

2. The device of claim 1 wherein said boom is comprised to two sections logitudinally and pivotally joined end to end.

3. The device of claim 2 wherein the first of said boom sections is pivotally mounted to said base at its free end while the free end of the second boom section is pivotally connected to said load cell means.

4. The device of claim 2 wherein said intermediate engagement means is disposed on said second boom section intermediate of its respective ends connecting the first boom section and connecting the load all means.

5. The device of claim 1 wherein said base is provided with means operatively connected for controlling said boom and load engaging means.

6. The device of claim 1 wherein said boom is mounted on a vehicle base.

7. The device of claim 1 wherein said load responsive means is a load cell connected said grasping means and said boom respectively by single pins.

8. The device of claim 1 which is specifically adapted for lifting and determining the weight of elongated objects.

9. The device of claim 1 wherein said means to cause vertical movement of the boom is hydraulic.

* * * * *